Nov. 24, 1970  F. SCARBOROUGH, SR  3,543,021
ULTRAVIOLET AIR STERILIZER AND OZONE GENERATOR
Filed Jan. 16, 1967  2 Sheets-Sheet 1
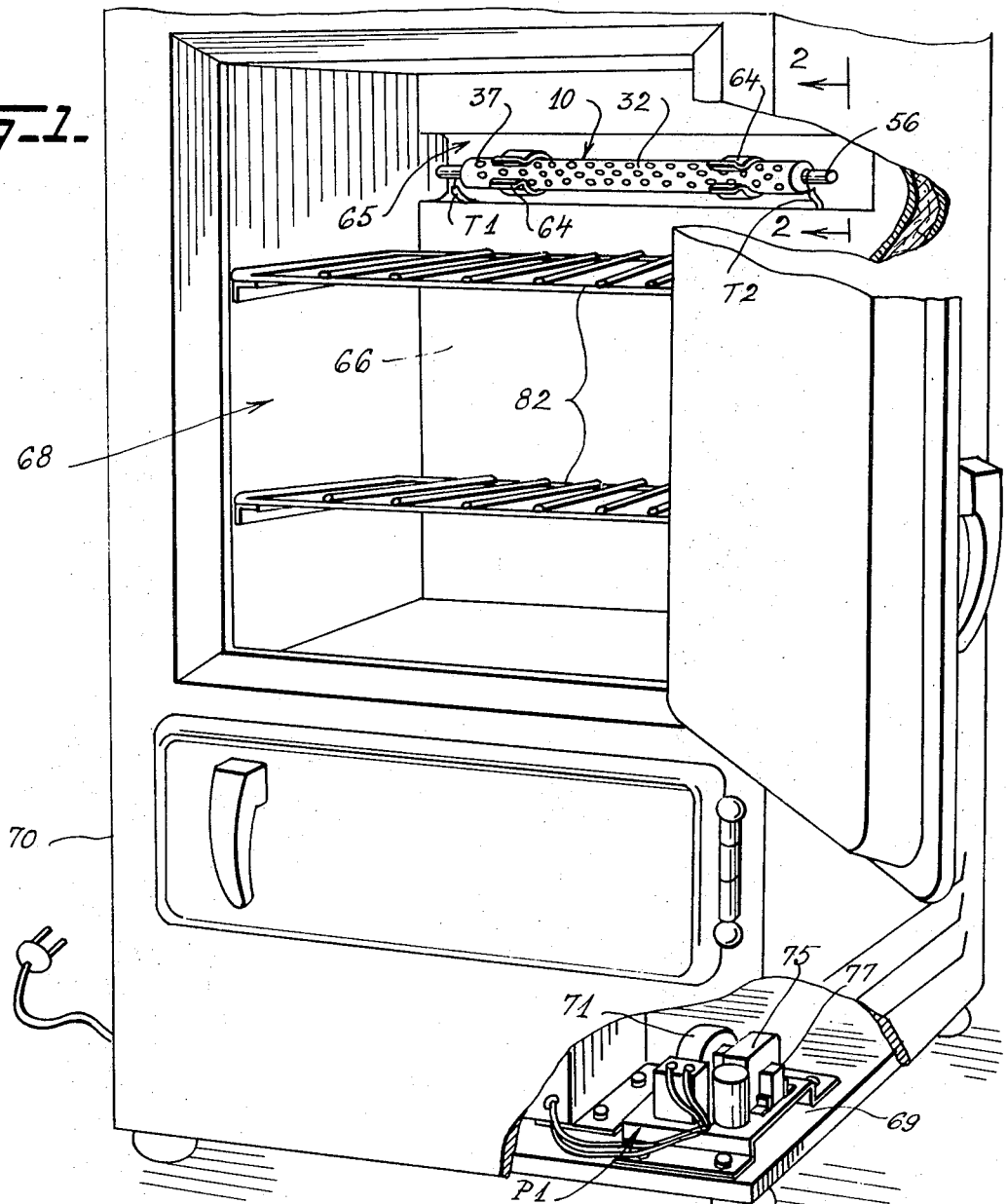
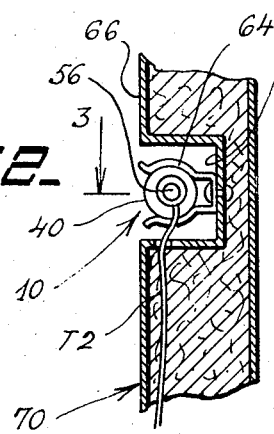
INVENTOR
Frederick Scarborough Sr.
BY
Polacheck & Saulsbury
ATTORNEYS

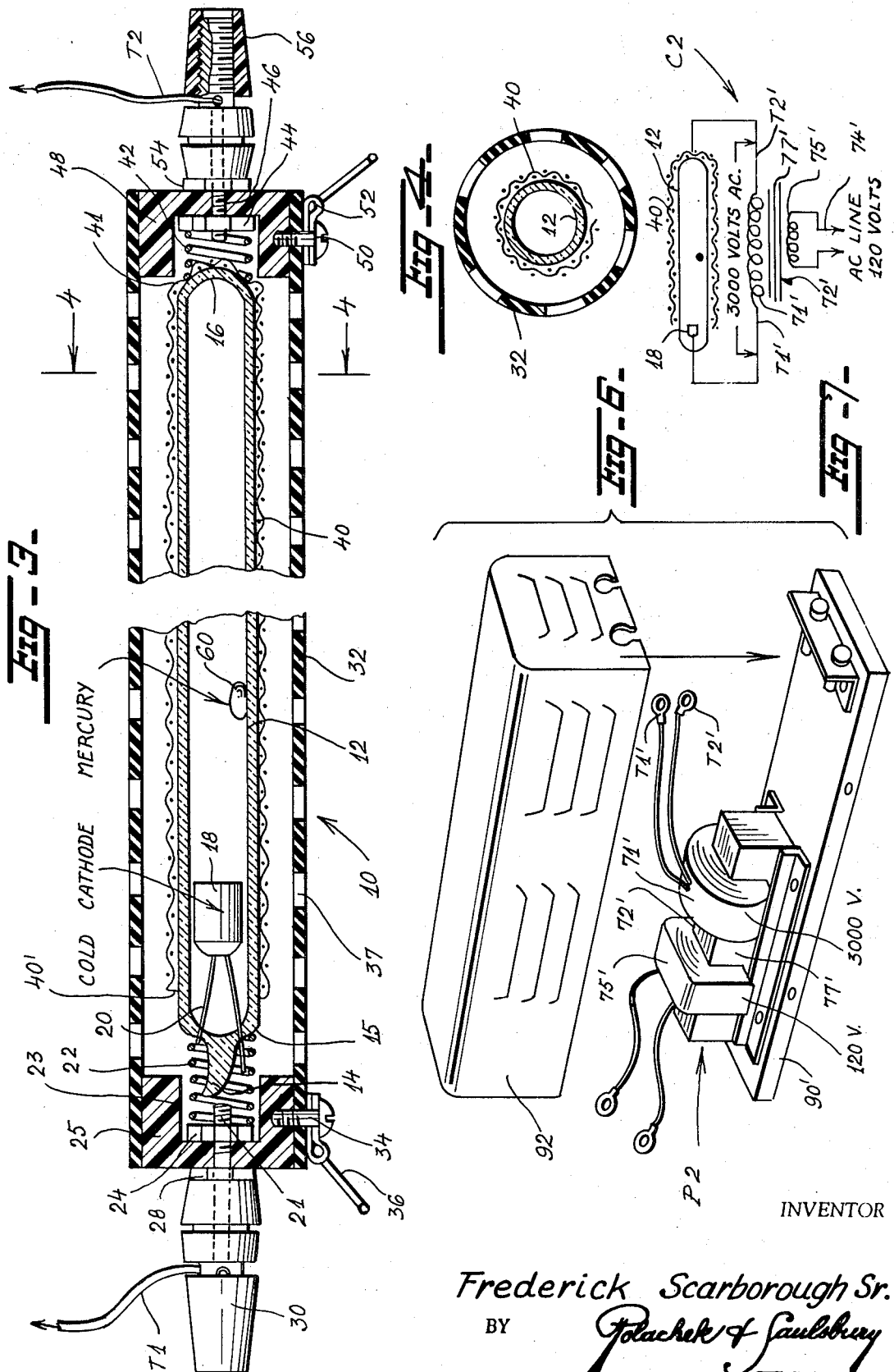

United States Patent Office 3,543,021
Patented Nov. 24, 1970

3,543,021
ULTRAVIOLET AIR STERILIZER AND OZONE GENERATOR
Frederick Scarborough, Sr., 310 Elm St.,
Northampton, Mass. 01060
Filed Jan. 16, 1967, Ser. No. 609,407
Int. Cl. H01j 11/00
U.S. Cl. 250—43                                1 Claim

ABSTRACT OF THE DISCLOSURE

An air sterilization device having concentric tubes, including an inner glass tube, transparent to ultraviolet rays, containing mercury vapor; an intermediate metal mesh tube, and an outer perforated plastic tube. One end of the inner tube is operatively connected to one end of a source of high voltage electric motive force. One end of the intermediate metal tube is connected to the other end of the electric source. The ozone and ultraviolet rays pass through the intermediate and outer tube and have a germicidal effect on ambient air.

According to modifications, the device may be used for filtering smoke from chimneys and may be used in removing harmful gases from vehicle exhaust pipes.

---

This invention concerns an air sterilization device and more particularly for installation in refrigerators, show cases and the like to prolong the freshness of fruits, vegetables, fish, meats, eggs and other foods. However, this device may have use for filtering smoke from chimneys and may be adapted for use in removing the harmful gases from vehicle exhaust pipes.

A principal object of the invention is to provide a device which can be used in the presence of foods while being transported, displayed or stored to inhibit growth of bacteria, molds, and other sources of contamination.

A further object is to provide a device of the character described which generates ozone and also emits ultraviolet rays to preserve and protect fresh foods and to purify ambient air around the foods.

Another object is to provide a device of the character described having a gas discharge tube provided with a cold cathode for positive ion discharge and with an outer metallic shield for generating ozone.

Still another object is to provide a device as last described wherein the device is energized by an AC source of 110–120 volts or by a DC source of 6, 12 or 24 volts.

According to the invention there is provided a unit including an evacuated sealed tube made of glass which is transparent to ultraviolet rays. The tube contains mercury vapor and may contain a gas such as argon under low pressure. It may also contain a small pool of mercury. An electrode at one end of the tube is connected to one terminal of a high voltage AC source of 3,000 or more volts. Surrounding the tube is a metallic perforated or mesh screen tube made of a nonferrous metal such as aluminum or copper. The perforated metal tube terminates short of the cathode end of the glass tube and surrounds the other end of the tube. The other terminal of the high voltage source is connected to the perforated metal tube. The glass and perforated metal tubes are supported by coil springs inside an apertured plastic tube. When the unit is energized, ozone is generated and the unit also emits ultraviolet light. The ozone and ultraviolet rays have a germicidal effect in ambient air.

For further comprehension of the invention and of the objects and advantages thereof, reference will be had to the following description and accompanying drawings and to the appended claim in which the various novel features of the invention are more particularly set forth.

In the accompanying drawings forming a material part of this disclosure:

FIG. 1 is a perspective view of a device embodying the invention including a sterilizing unit shown mounted in a refrigerator, with a power supply at the base of the refrigerator.

FIG. 2 is an enlarged end view of the unit taken on line 2—2 of FIG. 1, with part of a support for the unit shown in vertical section.

FIG. 3 is a further enlarged longitudinal sectional view taken on line 3—3 of FIG. 2.

FIG. 4 is a cross sectional view taken on line 4—4 of FIG. 3.

FIG. 5 is a diagram of the electric circuit employed in the arrangement of the device shown in FIG. 1.

FIG. 6 is an exploded perspective view of an AC power supply which may be employed to energize the sterilizing unit.

FIG. 7 is a diagram of another electric circuit employing the power supply of FIG. 6 to energize the sterilizing unit.

Referring first to FIGS. 1–4, there is shown a sterilizing unit 10 including an elongated glass tube 12 closed by a fused seal 14 at one end 15. The other end 16 of the tube is spherically curved. A metal cold cathode electrode 18 is located at the sealed end 15 of the tube. Connected to this cathode are wires 20 which extend out through end 15 of the tube and are secured to a metal coil spring 22. This spring bears on and supports end 15 of the tube. The other end of the spring bears on a nut 24. This nut engages a threaded stud 21 which extends through an electrically insulative plastic cylindrical plug 25. The plug 25 has a recess 23 in which seats nut 24 and the spring 22. Another nut 28 is engaged on the stud 21 at the outer end of the plug and holds the stud rigidly and coaxially with the plug. The stud has a screw cap 30 at its outer end which engages and holds one terminal T1 of a high voltage AC power supply P1 shown in FIG. 1. The plug 25 is held in one end of a plastic tube 32 by a lateral, radial screw 34 which may also engage a mounting ring 36. Tube 32 has a multiplicity of relatively large apertures 37 so that this tube protects the inner glass tube 12 which is coaxially supported inside the tube 32.

A perforated metal tube 40 preferably made of nonferrous metal mesh surrounds the tube 12. Tube 40 terminates at end 40' short of tube end 15. The other end 41 of the tube 40 extends around end 16 of tube 12. One end of a short metal coil spring 42 bears against ends 16 and 41 of tubes 12, 40. The outer end of spring 42 bears against nut 44 which engages a screw stud 46. Stud 46 extends axially outward of a cylindrical plastic plug 48 seated in the other end of plastic tube 32. A radially extending screw 50 holds plug 48 in tube 32 and may also engage a mounting ring 52. Stud 46 extends outwardly of plug 48 and is engaged by a nut 54 which holds the stud rigidly to the plug. A screw cap 56 on the outer end of the stud engages terminal T2 of the high voltage power supply P1. Tube 12 is thus cooperatively supported by springs 22 and 42 in a shock-proof mounting inside tube 32.

Tube 12 is evacuated of air and contains mercury vapor as well as a small pool of mercury 60. In addition the tube 12 may contain argon gas.

The unit 10 is shown in FIGS. 1, 2 removably mounted in spring bracket members 62, 64 in a recess 65 formed in inner wall 66 of refrigerator compartment 68. The unit 10 is electrically connected to power supply unit P1 mounted on base 69 at the bottom of refrigerator 70. The power supply unit P1 is best shown in FIGS. 1 and 5. In circuit C1 terminals T1, T2 are connected to the cathode 18 in tube 12, and to perforated tube 40 respectively. Terminals T1 and T2 are connected to opposite ends of secondary winding 71 of a step-up transformer 72. A large capacitor 73 of three microfarads is connected across terminals of primary winding 75. The primary is also connected to the low voltage AC terminals 76 of a vibrator 78. A battery 79 in series with an on-off switch 80 is connected to the DC input terminals of the vibrator. By the arrangement shown in FIG. 5, a DC voltage of 6, 12 or 24 volts can be converted and stepped up to several thousand volts AC at terminals T1, T2. Windings 71, 75 are wound on magnetic core 77.

When switch 80 is closed, the high AC voltage between metal screen tube 40 and spring 22 outside tube 12 generates ozone in the ambient air of the refrigerator compartment 68. In addition the gas inside tube 12 is caused to glow. This occurs because the thin wall of the glass tube 12 serves as a dielectric which is electrically stressed. The high voltage electric field created inside the tube causes an alternating ion flow between the electrode 18 and the wall of tube 12 where it is surrounded by tube 40, so that the gas in tube 12 glows and emits ultraviolet light. This radiated light has a germicidal effect in the ambient air circulating through and around the tube 32. Argon gas in the tube emits greenish light. Thus food on refrigerator shelves 82 is preserved and protected.

Power supply P1 will generally be used for refrigerators installed in vehicles such as trailers, trucks, boats, motorized camping vehicles, airplanes and other vehicles where low voltage current sources are generally employed. FIGS. 6 and 7 show a power supply P2 which can be used for energizing the unit 10, where ordinary AC line voltage of 110–120 volts is available. The power supply has a step-up transformer 72' having mutually magnetically coupled primary winding 75' and secondary winding 71' on core 77'. The AC line is connected to terminals of the primary winding. The high AC voltage is taken off terminals T1', T2' of the secondary winding. Other parts of circuit C2 corresponding to those of circuit C1 in FIG. 5 are identically numbered and have corresponding functions. Power supply P2 may be mounted on a baseboard 90' and provided with a cover 92.

There has thus been provided according to the invention, a device which can be energized from an AC or DC source to produce high voltage AC for activating an electrical sterilizing unit. The steriilzing unit according to the invention ionizes ambient air and emits germicidal electromagnetic waves.

While I have illustrated and described the preferred embodiments of my invention it is to be understood that I do not limit myself to the precise construction herein disclosed and that various changes and modifications may be made within the scope of the invention as defined in the appended claim.

What is claimed is:

1. An air sterilization device comprising an elongated cylindrical glass tube transparent to ultraviolet rays, said tube being evacuated of air filled with mercury vapor and hermetically sealed; an electrode sealed inside the tube at one end thereof; a metal screen surrounding the tube for almost its full length and terminating short of said one end of the tube; two shock absorbing springs supporting said tube at opposite ends thereof respectively; wire means connecting said electrode to one of the springs; an electrically insulative apertured protective plastic tube coaxial with and surrounding said glass tube and screen; two plastic plugs closing opposite ends of the plastic tube, said springs being engaged with said plugs respectively, whereby the glass tube and screen are supported inside the tube in spaced disposition with respect to ends and sides of the plastic tube; a first metal stud electrically continuous with said one spring and seated in one of said plugs for applying one terminal of a source of high alternating voltage to said electrode; and a second metal stud seated in the other one of said plugs and electrically continuous with the other spring, said other spring being electrically continuous with said screen for applying a second terminal of said source of high alternating voltage to said screen via said other spring and second stud, whereby ozone is generated in ambient air inside the plastic tube between said screen and said one spring and ultraviolet rays are generated inside the glass tube, and whereby the ozone and ultraviolet rays pass through apertures in the protective plastic tube.

References Cited

UNITED STATES PATENTS

| | | | |
|---|---|---|---|
| 1,965,187 | 7/1934 | Hartman | 250—43 |
| 2,338,079 | 12/1943 | Huge | 321—49 |
| 2,732,501 | 1/1956 | Blaeker | 250—43 |
| 3,247,374 | 4/1966 | Wintermute | 250—43 |

WALTER STOLWEIN, Primary Examiner

C. E. CHURCH, Assistant Examiner